US011257212B2

(12) United States Patent
Nagasaka

(10) Patent No.: US 11,257,212 B2
(45) Date of Patent: Feb. 22, 2022

(54) IMAGE ANALYSIS DEVICE

(71) Applicant: Toru Nagasaka, Nagoya (JP)

(72) Inventor: Toru Nagasaka, Nagoya (JP)

(73) Assignee: Toru Nagasaka, Nagoya (JP)

( * ) Notice: Subject to any disclaimer, the term of this patent is extended or adjusted under 35 U.S.C. 154(b) by 103 days.

(21) Appl. No.: 16/627,476

(22) PCT Filed: Jul. 7, 2017

(86) PCT No.: PCT/JP2017/024994
§ 371 (c)(1),
(2) Date: Dec. 30, 2019

(87) PCT Pub. No.: WO2019/008753
PCT Pub. Date: Jan. 10, 2019

(65) Prior Publication Data
US 2020/0219250 A1  Jul. 9, 2020

(51) Int. Cl.
*G06T 7/00* (2017.01)
(52) U.S. Cl.
CPC .. *G06T 7/0012* (2013.01); *G06T 2207/10056* (2013.01); *G06T 2207/30024* (2013.01); *G06T 2207/30242* (2013.01)
(58) Field of Classification Search
CPC ......... G06T 7/0012; G06T 2207/10056; G06T 2207/30024; G06T 2207/30242
See application file for complete search history.

(56) References Cited

U.S. PATENT DOCUMENTS

| 2006/0036372 A1 | 2/2006 | Yener et al. |
| 2010/0002920 A1 | 1/2010 | Cosatto et al. |
| 2011/0019898 A1 | 1/2011 | Takagi et al. |

FOREIGN PATENT DOCUMENTS

| JP | S6370384 A | 3/1988 |
| JP | 2011052700 A | 3/2011 |
| JP | 2011527055 A | 10/2011 |
| JP | 2016115084 A | 6/2016 |

(Continued)

OTHER PUBLICATIONS

European Extended Search Report for EP 17916884.4 dated Apr. 3, 2020.

(Continued)

*Primary Examiner* — Vu Le
*Assistant Examiner* — Winta Gebreslassie
(74) *Attorney, Agent, or Firm* — K&L Gates LLP

(57) ABSTRACT

An image analysis device acquires cell image data representing a cell image including a cell object, specifically a plurality of partial images, and determine, for each of the partial images, if this partial image includes the cell object. The device generates first specific data including a plurality of values arranged at a plurality of positions corresponding to the partial images. The values include a presence value arranged at a position corresponding to a partial image that includes the cell object. The device specifies a plurality of partial data from the first specific data, count a number of cell object in the cell image from the plurality of partial data and the plurality of pattern data, and outputs a count result. The image analysis device counts "one" as a number of cell object corresponding to the target partial data despite the partial data including two or more presence values.

5 Claims, 14 Drawing Sheets

(56) References Cited

FOREIGN PATENT DOCUMENTS

| WO | 03060653 | A2 | 7/2003 |
|----|----------|----|--------|
| WO | 2019008753 | A1 | 1/2019 |

OTHER PUBLICATIONS

Written Opinion of the International Searching Authority for PCT Application No. PCT/JP2017/024994 dated Sep. 19, 2017 (English translation).

International Search Report and Written Opinion for PCT/JP2017/024994 dated Sep. 19, 2017 (English translation).

3-5 set

FIG. 11

- 3-6 set
  3-6
  2-2 → 2-4

- 3-7 set
  3-7
  2-5 → 2-7

- 3-8 set
  3-8
  2-6 → 2-8

- 3-9 set
  3-9
  2-1 → 2-3

- 3-10 set
  3-10
  2-2 → 2-4

- 3-11 set
  3-11
  2-5 → 2-7

- 3-12 set
  3-12
  2-6 → 2-8

- 3-13 set
  3-13
  2-6 → 2-8

- 3-14 set
  3-14
  2-2 → 2-4

- 3-15 set
  3-15
  2-3 → 2-1

- 3-16 set
  3-16
  2-5 → 2-7

- 3-17 set
  3-17
  2-6 → 2-8

- 3-18 set
  3-18
  2-8 → 2-6

- 3-19 set
  3-19
  2-5 → 2-7

- 3-20 set
  3-20
  2-5 → 2-7

- 4-1 set
  4-1
  4-2 → 2-1

- 4-2 set
  4-2
  4-4 → 2-6

- 4-29 set
  4-29
  2-1 → 2-3

- 4-30 set
  4-30
  2-2 → 2-4

- 4-31 set
  4-31
  2-5 → 2-7

- 4-32 set
  4-32
  2-5 → 2-8

IMAGE ANALYSIS DEVICE

CROSS-REFERENCE TO RELATED APPLICATIONS

This application is a U.S. National Stage Entry under 35 U.S.C. § 371 of International Patent Application No. PCT/JP2017/024994, filed Jul. 7, 2017, entitled IMAGE ANALYSIS DEVICE, the entire disclosure of which is hereby incorporated by reference herein in its entirety and for all purposes.

TECHNICAL FIELD

The disclosure herein discloses an image analysis device configured to analyze a cell image including cell objects.

BACKGROUND ART

In recent years, pathological diagnosis or cytodiagnosis using an image analysis device is practiced (for example, Japanese Patent Application Publication No. 2011-527055). In this technique, data for classifying cell objects is learned by the image analysis device in advance, and then cell image data obtained from a pathological specimen or a cytodiagnostic specimen is inputted to the image analysis device, by which classification results for cell objects included in a cell image represented by the cell image data are obtained.

SUMMARY OF INVENTION

Technical Problem

Normally in pathological diagnosis aid or automatic cytodiagnosis using an image analysis device, a plurality of partial images is sequentially specified from a cell image. Then, for each of the plurality of partial images, cells corresponding to cell objects included in the partial image are classified, and the numbers of cell objects included in the cell image are counted for respective types of cell objects based on the classification results. However, when a same cell object is included in two or more partial images, for example, it could be erroneously recognized that different cell objects are respectively included in those two or more partial images. In such a case, the number of cell object included in these two or more partial images is counted as "two or more", although it should actually be counted as "one".

The disclosure herein discloses art that accurately counts a number of cell object included in a cell image.

An image analysis device may comprise: an acquiring unit configured to acquire cell image data representing a cell image including one or more types of cell objects indicating one or more types of cells; a partial image specifying unit configured to specify a plurality of partial images from the cell image, wherein the plurality of partial images each has a same size, and the cell image includes two or more partial images arranged along a first direction and two or more partial images arranged along a second direction perpendicular to the first direction; a cell determining unit configured to determine, for each of the plurality of partial images, whether or not the partial image includes any of the one or more types of cell objects; a first specific data generating unit configured to generate first specific data including a plurality of values arranged at a plurality of positions corresponding to the plurality of partial images, wherein the plurality of values included in the first specific data includes an absence value arranged at a position corresponding to a partial image determined as not including any of the one or more types of cell objects and a first presence value arranged at a position corresponding to a partial image determined as including a first type of cell object among the one or more types of cell objects; a partial data specifying unit configured to specify a plurality of partial data from the first specific data, wherein the partial data each includes (M×N) values constituted of M values arranged along the first direction (where the M is an integer of 2 or greater) and N values arranged along the second direction (where the N is an integer of 2 or greater); a counter unit configured to count a number of the first type of cell objects included in the cell image by using the plurality of partial data and a predetermined plurality of pattern data, wherein the pattern data each includes (M×N) values constituted of M values arranged along the first direction and N values arranged along the second direction, the (M×N) values included in the pattern data include two or more first predetermined values and one or more second predetermined values, and the plurality of pattern data each has a different arrangement of the first predetermined value; and an output unit configured to output a count result, wherein the counter unit comprises a first presence value determining unit configured to determine, for each of the plurality of partial data, whether or not an arrangement of the first presence value in the partial data matches an arrangement of the first predetermined value in any of the plurality of pattern data, and in a case of determining that an arrangement of the first presence value in first target partial data among the plurality of partial data matches an arrangement of the first predetermined value in any of the plurality of pattern data, the counter unit counts "one" as a number of the first type of cell objects corresponding to the first target partial data despite (M×N) values included in the first target partial data including two or more first presence values.

According to the above configuration, the image analysis device generates the first specific data that includes the plurality of values arranged at the plurality of positions corresponding to the plurality of partial images specified from the cell image, specifies the plurality of partial data from the first specific data, and counts the number of the first type of cell object included in the cell image by using the plurality of partial data and the predefined plurality of pattern data. Here, in the case where it is determined that the arrangement of the first presence value in the first target partial data among the plurality of partial data matches the arrangement of the first predetermined value in any of the plurality of pattern data, the image analysis device counts the number of the first type of cell object corresponding to the first target partial data as "one", despite the fact that the first target partial data includes the two or more first presence values. Thus, the image analysis device can accurately count the number of the first type of cell object included in the cell image.

The image analysis device may further comprise a second specific data generating unit configured to generate second specific data by using the plurality of partial data and the plurality of pattern data, wherein the second specific data includes a plurality of values arranged at a plurality of positions corresponding to the plurality of partial images. The plurality of values included in the second specific data may include one or more first presence values and the absence value arranged at a position corresponding to a partial image determined as not including any of the one or more types of cell objects. In the case of determining that the arrangement of first presence value in the first target partial data matches the arrangement of the first predetermined value in one of the plurality of pattern data, the second specific data generating unit may generate the second specific data by describing one first presence value at a predetermined position corresponding to the first target partial data instead of two or more adjacent first presence values included in the first target partial data. The counter unit may count the number of the first type of cell object included in the cell image by counting a number of the first presence values included in the second specific data. According to this configuration, the image analysis device can accurately count the number of cell objects included in the cell image by using the second specific data.

The M and the N may be a same odd number of 3 or greater, the plurality of pattern data may include a set of three or more predetermined pattern data. The counter unit may further comprise: a first intermediate data generating unit configured to generate first intermediate data in a case of determining that the arrangement of the first presence value in the first target partial data matches an arrangement of the first predetermined value in first pattern data included in the set, wherein the first intermediate data has a third predetermined value described at a position corresponding to a center in the (M×N) values included in the first target partial data and a fourth predetermined value described at each position corresponding to each value other than the center in the (M×N) values included in the first target partial data; a second intermediate data generating unit configured to generate second intermediate data in a case of determining that an arrangement of the first presence value in second target partial data matches an arrangement of the first predetermined value in second pattern data, wherein the second target partial data is among the plurality of partial data and is adjacent to the first target partial data, the second pattern data is included in the set and is different from the first pattern data, and the second intermediate data has the third predetermined value described at a position corresponding to a center in (M×N) values included in the second target partial data and the fourth predetermined value described at each position corresponding to each value other than the center in the (M×N) values included in the second target partial data; a third intermediate data generating unit configured to generate third intermediate data by synthesizing the first intermediate data and the second intermediate data, wherein the third predetermined value included in the first intermediate data and the third predetermined value included in the second intermediate data are adjacent each other in the third intermediate data; a purpose data specifying unit configured to sequentially specify a plurality of purpose data from the third intermediate data, wherein the purpose data each includes (M×N) values constituted of M values arranged along the first direction and N values arranged along the second direction; and a predetermined value determining unit configured to determine, for each of the plurality of purpose data, whether or not an arrangement of the third predetermined value in the purpose data matches an arrangement of the first predetermined value in third pattern data that is included in the set and is different from the first and second pattern data. In a case of determining that an arrangement of the third predetermined value in target purpose data, which is among the plurality of purpose data and includes two or more third predetermined values, matches the arrangement of the first predetermined value in the third pattern data, the counter unit may count "one" as the number of the first type of cell object corresponding to the first target partial data. According to this configuration, the image analysis device can more accurately count the number of cell objects.

The plurality of values included in the first specific data may further include a second presence value arranged at a position corresponding to a partial image determined as including a second type of cell object, wherein the second presence value is different from the first presence value, wherein the second type of cell object is among the one or more types of cell objects and is different from the first type of cell object. The counter unit may comprise a second presence value determining unit configured to determine, for each of the plurality of partial data, whether or not an arrangement of the second presence value in the partial data matches an arrangement of the first predetermined value in any of the plurality of pattern data. In a case of determining that an arrangement of the second presence value in second target partial data among the plurality of partial data matches an arrangement of the first predetermined value in any of the plurality of pattern data, the counter unit may count "one" as a number of the second type of cell object corresponding to the second target partial data despite (M×N) values included in the second target partial data including two or more second presence values. According to this configuration, the image analysis device can accurately count the numbers of two or more types of cell objects.

A control method, a computer program and a non-transitory computer-readable medium storing the computer program for implementing the above image analysis device are also novel and useful.

BRIEF DESCRIPTION OF DRAWINGS

FIG. 11 shows examples of the set of pattern data.

CONFIGURATION OF IMAGE ANALYSIS DEVICE: FIG. 1

FIG. 1 shows a configuration of an image analysis device 10. The image analysis device 10 is provided with an operation unit 12, a display unit 14, an input unit 16, and a controller 30. The respective units 12 to 30 are connected to a bus line (reference sign omitted). The operation unit 12 is provided with a mouse and a keyboard, for example. A user can input various instructions to the image analysis device 10 by operating the operation unit 12. The display unit 14 is a display configured to display various types of information.

Figure 1:
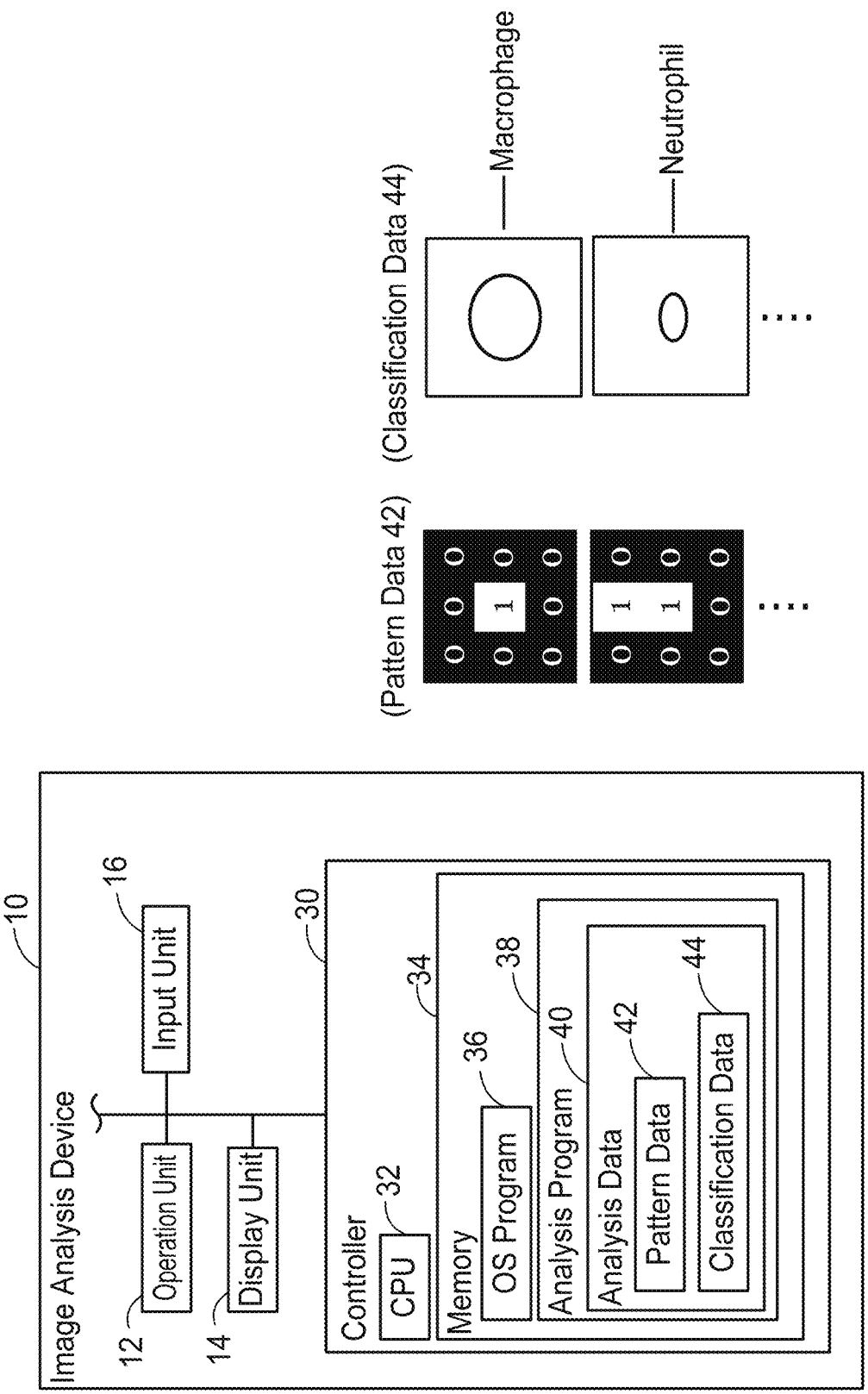
FIG. 1 shows a block diagram of an image analysis device.

The input unit 16 is a device for inputting, to the image analysis device 10, cell image data that represents a cell image including one or more types of cell objects indicating one or more types of cells. The input unit 16 may be a communication interface configured to execute wired or wireless communication, or may be a memory interface to which a USB memory is inserted. For example, the cell image data may be inputted to the image analysis device 10 by the input unit 16 executing wired or wireless communication with a device that stores the cell image data captured by a microscope, Whole Slide Image, or virtual slide and receiving the cell image data from this device. Further, for example, the cell image data may be inputted to the image analysis device 10 by the input unit 16 reading out the cell image data from a memory that stores the cell image data.

The controller 30 is provided with a CPU 32 and a memory 34. The CPU 32 is configured to execute various processes according to programs 36, 38 stored in the memory 34. The memory 34 stores the OS program 36 for realizing basic operations of the image analysis device 10 and the analysis program 38 for executing image analysis according to a convolutional neural network (hereinbelow called "CNN (abbreviation of Convolutional Neural Network)"). The image analysis device 10 is realized, for example, by installing the analysis program 38 in a general-purpose PC or server. The analysis program 38 may execute image analysis according to a large-scale network having the CNN as its partial structure (such as GoogLeNet (registered trademark) or Residual Network). The analysis program 38 includes analysis data 40. The analysis data 40 includes a predetermined plurality of pattern data 42 and classification data 44 for classifying cell objects.

The plurality of pattern data 42 is data used for executing a process of counting a number of cell objects. Each of the plurality of pattern data 42 includes 9 (3×3) values constituted of three values arranged along a left-right direction and three values arranged along an up-down direction. The 9 (3×3) values included in a single piece of the pattern data include one or more of value "1" and one or more of value "0".

The classification data 44 is data in which each of a plurality of images is associated with a type of cell object (such as macrophage and neutrophil) included in the image. The classification data 44 in this embodiment is data that enables classification for plural types of cell objects, however, it may be data that enables classification (that is, specification) only for one type of cell object in a variant.

Figure 2:
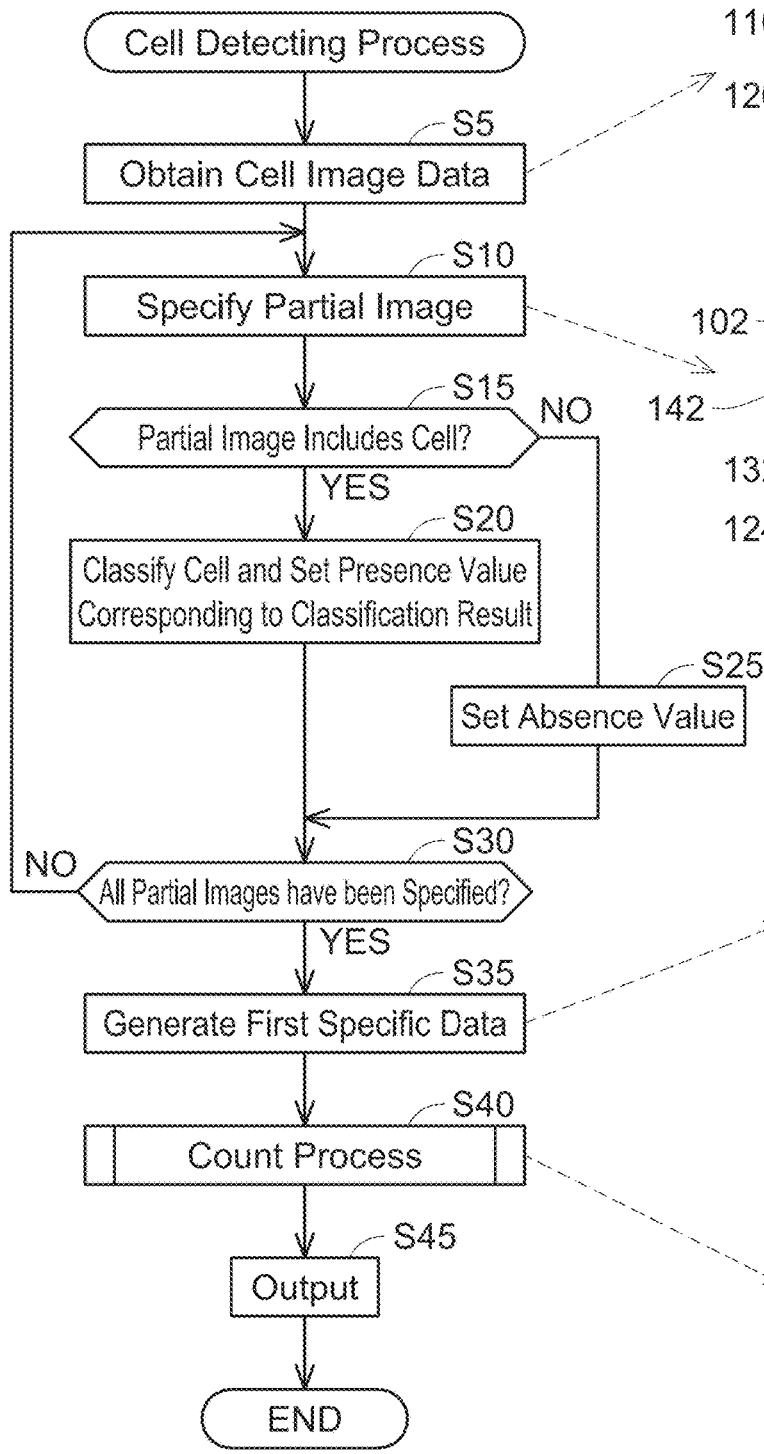
FIG. 2 shows a flowchart of a process executed by the image analysis device.
Figure 2:
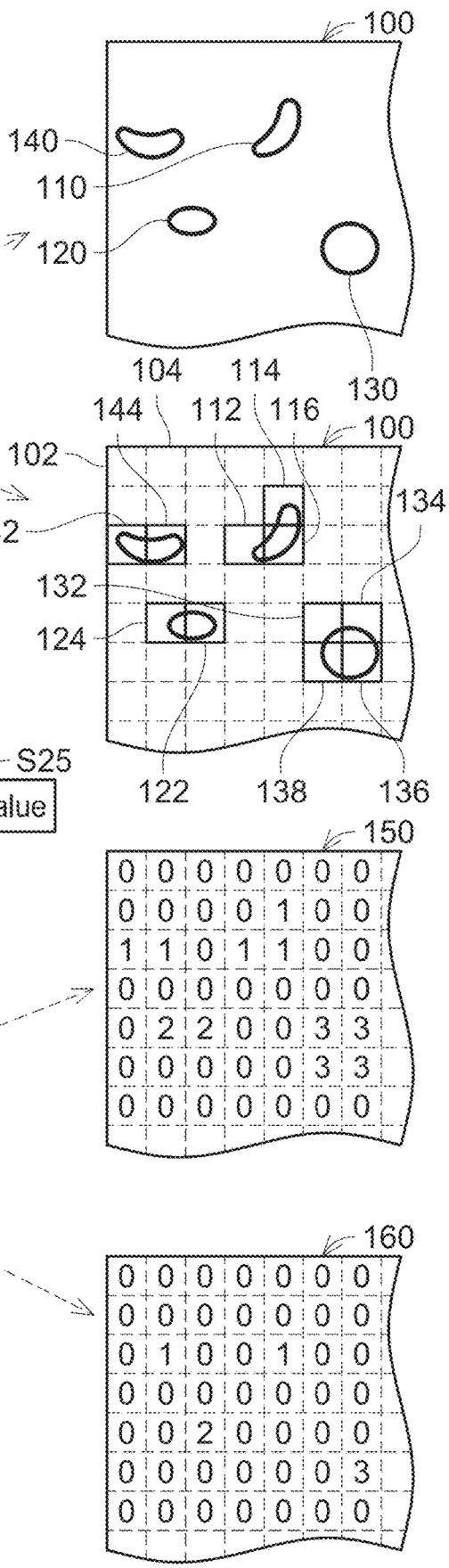

(Process of Image Analysis Device 10: FIG. 2)

Next, a process which the CPU 32 of the image analysis device 10 executes according to the analysis program 38 will be described with reference to FIG. 2. In S5, the CPU 32 obtains, through the input unit 16, cell image data that represents a cell image 100 including one or more types of cell objects 110, 120, 130, 140. The cell image data is bitmap data constituted of a plurality of pixels having multilevel RGB values (such as in 256 levels). A file format of the bitmap data is not limited to BMP (Microsoft Windows (registered trademark) Bitmap Image), and may be JPEG (Joint Photographic Experts Group), TIFF (Tagged Image File Format), or the like. The cell image data is generated as described below. For example, bronchoalveolar lavage fluid, which is a specimen collected from a patient, is applied to a slide glass and is subjected to Giemsa staining to produce a pathological specimen. Then, the pathological specimen is captured by a microscope to generate cell image data. The pathological specimen is not limited to the above. For example, the specimen may be a blood specimen, a biological specimen, or the like, and the staining method may be a Papanicolaou staining method, a hematoxylin and eosin staining method, an immunohistochemistry staining method, or an immunofluorescence staining method. Further, an unstained phase-contrast microscopic image of cultured cells may be used.

In S10, the CPU 32 specifies one partial image from the cell image 100. In the example of FIG. 2, every rectangle surrounded by plural broken lines depicted inside the cell image 100 indicates one partial image. Specifically, the CPU 32 specifies one partial image 102 located at an upper left corner of the cell image 100 in a first round of S10. A size of one partial image (that is, its lengths in the left-right direction and the up-down direction) is predetermined. Each partial image has a rectangular shape in square in the present embodiment, however, it may have a rectangular shape in rectangle in a variant, and it may have a shape other than rectangle (such as a circular shape) in another variant. Further, the CPU 32 specifies a partial image 104 adjacent to the partial image 102 on the right in a second round of S10 which is executed after the first round of S10 and processes of S15 to S30 to be described later have been executed. By repeating this, the CPU 32 sequentially specifies partial images from left to right. Further, after having specified a rightmost partial image, the CPU 32 specifies a partial image immediately under the partial image 102 in the subsequent round of S10, and further specifies a partial image adjacent to this partial image on the right in the next round of S10. By repeating this, the CPU 32 sequentially specifies, from the cell image 100, plural partial images that include two or more partial images arranged along the left-right direction and two or more partial images arranged along the up-down direction. In the present embodiment, the respective partial images are specified such that the partial images do not overlap each other, however, the respective partial images may be specified such that the partial images overlap each other in a variant.

In S15, the CPU 32 executes CNN using the partial image specified in S10 (hereinbelow termed "target partial image") and the classification data 44, to determine whether or not the target partial image includes any of the plural types of cell objects which can be classified by the classification data 44. Specifically, each of the plurality of images constituting the classification data 44 includes a cell object. In a case of determining that the target partial image includes a cell object that matches or is similar to any of the cell objects included in the plurality of images constituting the classification data 44, the CPU 32 determines YES in S15 and proceeds to S20, while in a case of determining that the target partial image does not include a cell object that matches or is not similar to any of the cell objects included in the plurality of images constituting the classification data 44, the CPU 32 determines NO in S15 and proceeds to S25.

In S20, the CPU 32 classifies the type of cell object included in the target partial image and sets a presence value corresponding to the classification result. As described above, in the classification data 44, each of the plural images is associated with a type of cell object included in that image (such as macrophage) (see FIG. 1). The CPU 32 specifies an image determined as matching or being similar to the cell object included in the target partial image in S15 from among the plurality of images constituting the classification data 44, and specifies the type of cell object associated with this image. By doing so, the CPU 32 can classify the type of cell object. Then, the CPU 32 stores a position of the target partial image and the presence value corresponding to the classification result in association with each other in the memory 34. Here, in the present embodiment, the position of the target partial image is represented by a coordinate (x, y). The x indicates a position in the left-right direction and the y indicates a position in the up-down direction. For example, a position of the partial image 102 is (1, 1), and a position of the partial image 104 is (2, 1). Further, the presence value is a value indicating that a cell object is present within the partial image, where the presence value corresponding to a first type of cell object (such as macrophage) is "1", the presence value corresponding to a second type of cell object (such as neutrophil) is "2", and the presence value corresponding to a third type of cell object is "3".

In the example of FIG. 2, partial images 112, 114, 116, 142, 144 are each determined as including the first type of cell object (YES in S15), therefore positions of the partial images 112, etc. each are stored in association with the presence value "1" (S20). Further, since partial images 122, 124 are each determined as including the second type of cell object (YES in S15), positions of the partial images 122, etc. each are stored in association with the presence value "2" (S20). Further, since partial images 132, 134, 136, 138 are each determined as including the third type of cell object (YES in S15), positions of the partial images 132, etc. each are stored in association with the presence value "3". When S20 is completed, the CPU 32 proceeds to S30.

On the other hand, in S25, the CPU 32 stores the position of the target partial image (that is, the coordinate thereof) and an absence value in association with each other in the memory 34. The absence value is a value indicating that no cell object is present in the partial image and is "0" in the present embodiment. In the example of FIG. 2, partial images (such as 102 and 104) other than the partial images 112 to 144 are each determined as not including any cell object (NO in S15), thus positions of these partial images each are stored in association with the absence value "0" (S25). When the process of S25 is completed, the CPU 32 proceeds to S30.

In S30, the CPU 32 determines whether or not all the partial images have been specified in S10 from the cell image 100. The CPU 32 proceeds to S35 in a case of determining that all the partial images have been specified (YES in S30), while it returns to S10 in a case of determining that not all the partial images have been yet specified (NO in S30) and specifies a subsequent partial image.

In S35, the CPU 32 generates first specific data 150 by using the respective information stored in S20 and S25 (that is, the respective information in each of which the position (that is, the coordinate) and the presence value (or the absence value) are associated). Specifically, based on each of the information stored in S20 and S25, the CPU 32 describes the presence value or the absence value indicated by the information at the position (that is, the coordinate) indicated by the information. In the example of FIG. 2, the first specific data 150 including five presence values "1", two presence values "2", and four presence values "3" is generated. As above, a first type of cell object 110 in the cell image 100 is represented by the three adjacent presence values "1" in the first specific data 150, and a first type of cell object 140 in the cell image 100 is represented by the two adjacent presence values "1" in the first specific data 150, for example. Thus, counting "five", which is a total number of the presence values "1" included in the first specific data 150, as the number of first type of cell objects brings an incorrect count result because the cell image 100 actually includes only two first type of cell objects 110, 140. For this reason, the CPU 32 executes a process for counting two or more adjacent presence values as one cell object in S40 below.

In S40, the CPU 32 executes a count process (see FIG. 3) by using the first specific data 150 and the pattern data 42. The count process is a process of generating second specific data 160 by using the first specific data 150 and the pattern data 42 and counting the numbers of cell objects from the second specific data 160. In the example of FIG. 2, the second specific data 160 includes two presence values "1" corresponding to the first type of cell objects, one presence value "2" corresponding to the second type of cell object, and one presence value "3" corresponding to the third type of cell object. As such, "two" is counted as the number of the first type of cell objects, "one" is counted as the number of the second type of cell object, and "one" is counted as the number of the third type of cell object.

In S45, the CPU 32 outputs the count results of S40. In this embodiment, the count results are outputted for the respective types of cell objects. In the example of the second specific data 160 of FIG. 2, information indicating "the first type of cell object=2", information indicating "the second type of cell object=1", and information indicating "the third type of cell object=1" are outputted. In a variant, a sum of count results for all types of cell objects may be outputted or a cell object density per unit area may be outputted for each type of cell object, instead of the count results being outputted for the respective types of cell objects.

Figure 3:
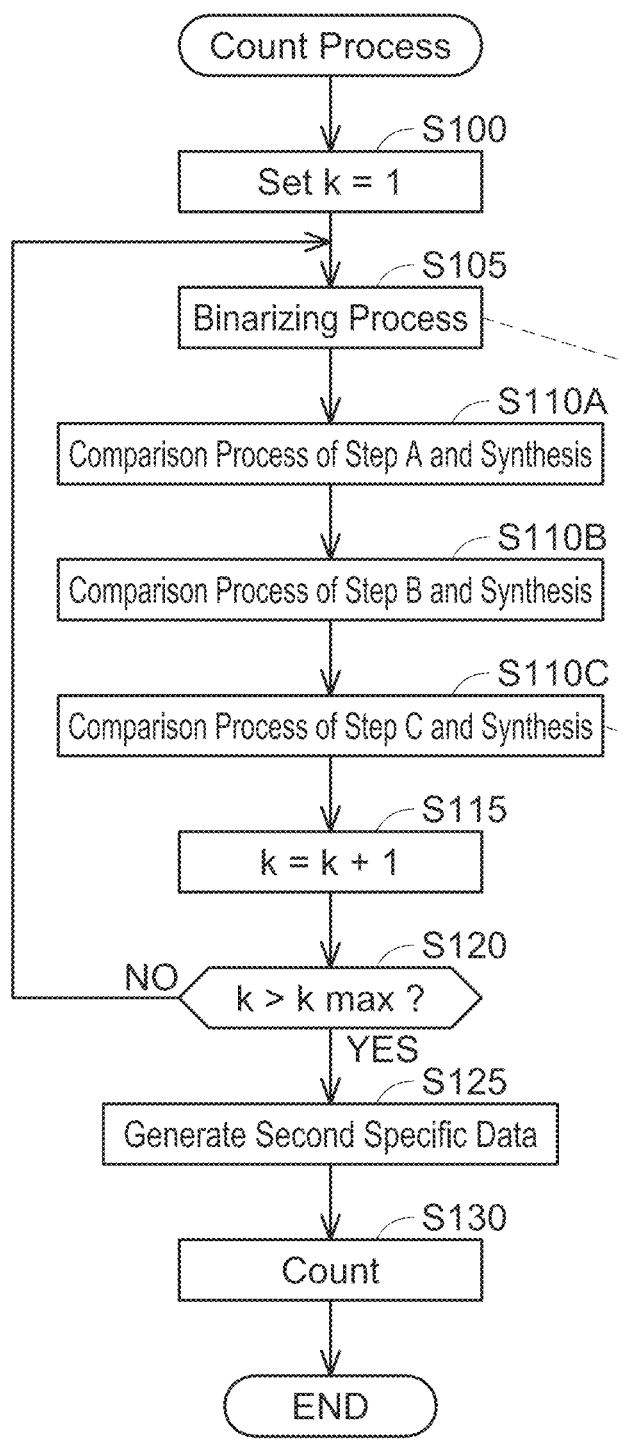
FIG. 3 shows a flowchart of a count process.
Figure 3:
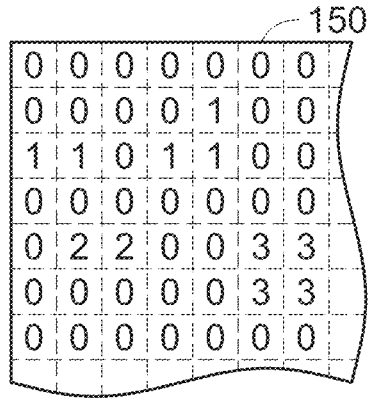
Figure 3:
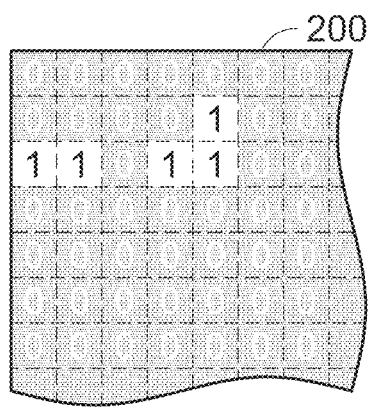
Figure 3:
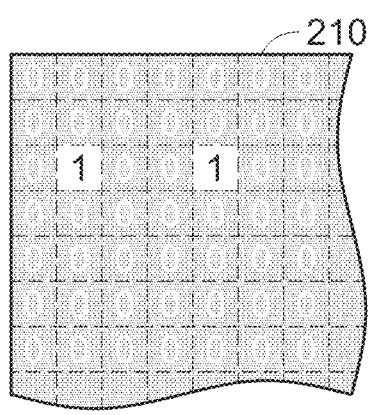

(Count Process; FIG. 3)

Next, details of the count process of S40 of FIG. 2 will be described with reference to FIG. 3. In S100, the CPU 32 sets a pointer k (k being an integer of 1 or greater) that indicates the presence value of a processing target to "1".

In S105, the CPU 32 generates binary data 200 by binarizing the first specific data 150 generated in S35 of FIG. 2. Specifically, the CPU 32 determines whether each of the plurality of values included in the first specific data 150 matches the k or not. In a case where the value matches k, the CPU 32 describes "1" at a position corresponding to that value, while in a case where the value does not match k, the CPU 32 describes "0" at the position corresponding to the value. By doing so, the binary data 200 constituted of a plurality of values each indicating either "1" or "0" is generated. FIG. 3 shows the binary data 200 generated from the first specific data 150 in a case of k=1.

In S110A, the CPU 32 generates synthesized data by using the binary data 200 and the pattern data 42 and by executing a comparison process of step A (see FIG. 8) and synthesizing a plurality of pre-synthesis data generated as a result of the comparison process.

In S110B, the CPU 32 generates synthesized data by using the synthesized data generated in S110A and the pattern data 42 and by executing a comparison process of step B (see FIG. 8) and synthesizing a plurality of pre-synthesis data generated as a result of the comparison process.

In S110C, the CPU 32 generates synthesized data by using the synthesized data generated in S110B and the pattern data 42 and by executing a comparison process of step C (see FIG. 8) and synthesizing a plurality of pre-synthesis data generated as a result of the comparison process.

The processes of S110A to S110C are processes for generating synthesized data 210 in which one value "1" is described as a substitute for the two or more adjacent values "1" in the binary data 200. The example of FIG. 3 generates the synthesized data 210 in which one value "1" is described as a substitute for the three adjacent values "1" in the binary data 200 and one value "1" is described as a substitute for the two adjacent values "1" in the binary data 200.

Figure 13A:
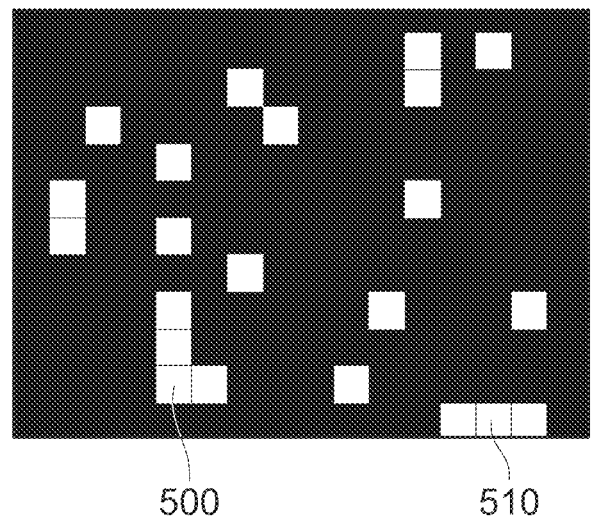
FIG. 13A to 13D show examples of data generated by the image analysis device.
Figure 13B:
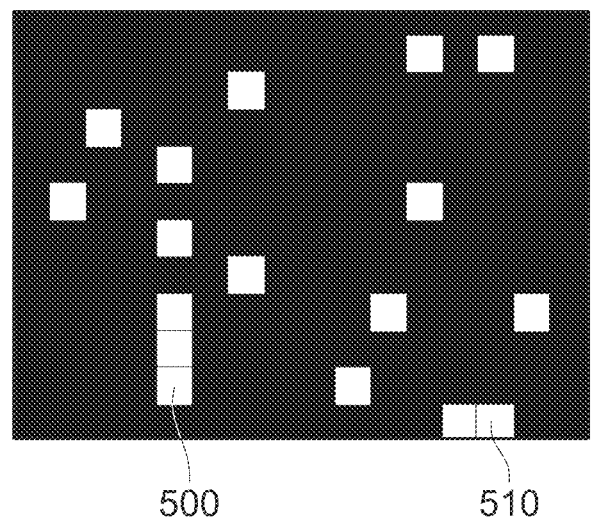

In FIGS. 13A to 13D, the value "1" and the value "0" are respectively expressed in white and black. For example, in a case where binary data of FIG. 13A is generated in S105, synthesized data of FIG. 13B is generated in S110A. Due to this, three adjacent values "1" are described as a substitute for four adjacent values "1" denoted with a reference sign 500 in FIG. 13A, and two adjacent values "1" are described as a substitute for three adjacent values "1" denoted with a reference sign 510 in FIG. 13A.

Figure 13C:
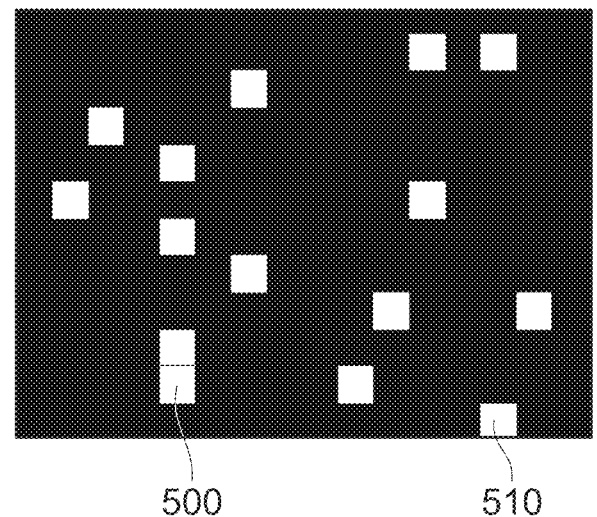
Figure 13D:
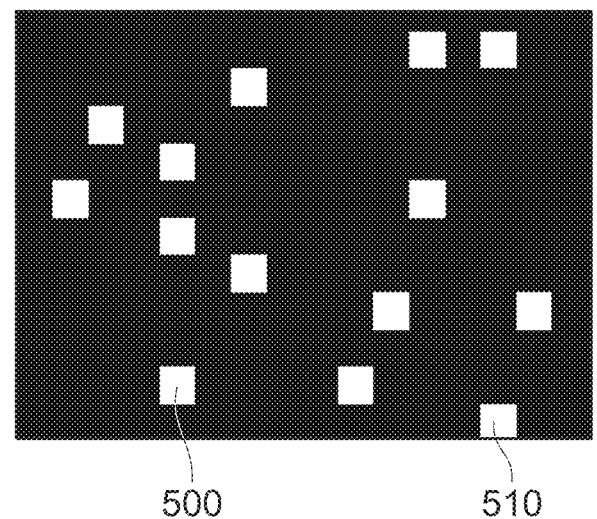

Further, in S110B, synthesized data of FIG. 13C is generated from the synthesized data of FIG. 13B. Due to this, two adjacent values "1" are described as a substitute for the three adjacent values "1" denoted with the reference sign 500 in FIG. 13B, and one value "1" is described as a substitute for the two adjacent values "1" denoted with the reference sign 510 in FIG. 13B. Then, in S110C, synthesized data of FIG. 13D is generated from the synthesized data of FIG. 13C. Due to this, one value "1" is described as a substitute for the two adjacent values "1" denoted with the reference sign 500 in FIG. 13C. As above, the processes of S110A to S110C generate the synthesized data in which one value "1" is described as a substitute for the two or more adjacent values "1" in the binary data. By counting the number of the values "1" in this synthesized data, the number of cell objects can accurately be counted.

In S115, the CPU 32 increments the k. Then, in S120, the CPU 32 determines whether or not the incremented k is greater than a $k_{MAX}$. The $k_{MAX}$ indicates the number of types of cell objects which can be classified by the classification data 44 (such as "3"). The CPU 32 proceeds to S125 in a case of determining that the k is greater than the $k_{MAX}$ (YES in S120), while it returns to S105 in a case of determining that the k is equal to or less than the $k_{MAX}$ (NO in S120) and generates binary data by using the incremented k (such as "2"). The CPU 32 repeats the processes of S105 to S120 with the values of k (that is, the presence values) to generate a plurality of binary data corresponding to the respective values of k (S105) and generate a plurality of synthesized data corresponding to the respective values of k (S110A to S110C).

In S125, the CPU 32 generates the second specific data 160 (see FIG. 2) by using the plurality of synthesized data corresponding to the values of k. Firstly, the CPU 32 changes each of the values "1" included in the synthesized data corresponding to k=2 to "2", which is the value matches the k. Similarly, the CPU 32 changes each of the values "1" included in the respective synthesized data corresponding to k=3, 4, . . . to the values that match the corresponding k. Then, the CPU 32 synthesizes the synthesized data corresponding to k=1 (that is, the synthesized data including the values "1") and the respective data after the changes to k=2, 3, . . . (that is, the synthesized data including the values "2", "3", . . . respectively) to generate the second specific data 160. Here, "synthesis" means logical sum. For example, in a case where a value at the position (1, 1) indicates "1" in certain data and a value at the position (1, 1) indicates "0" in another data, the synthesized data thereof is generated so as to have the value "1" at the position (1, 1). Further, in a case where a value at the position (1, 1) indicates "0" in certain data and a value at the position (1, 1) indicates "0" in another data, the synthesized data thereof is generated so as to have the value "0" at the position (1, 1). Hereinbelow as well, when the term "synthesis" is used, it means the logical sum of a plurality of values.

In S130, the CPU 32 counts the number of cell objects for each type thereof by using the second specific data 160. Specifically, the CPU 32 firstly counts the number of the values "1" included in the second specific data 160 and specifies this count result as the number of the first type of object (such as macrophage). Similarly, the CPU 32 respectively counts the numbers of the values "2", "3", . . . included in the second specific data 160 and specifies these as the numbers of second and third types of object. When the process of S130 is completed, FIG. 3 is terminated.

(Details of Pattern Data 42; FIGS. 4 to 7)

Figure 4:
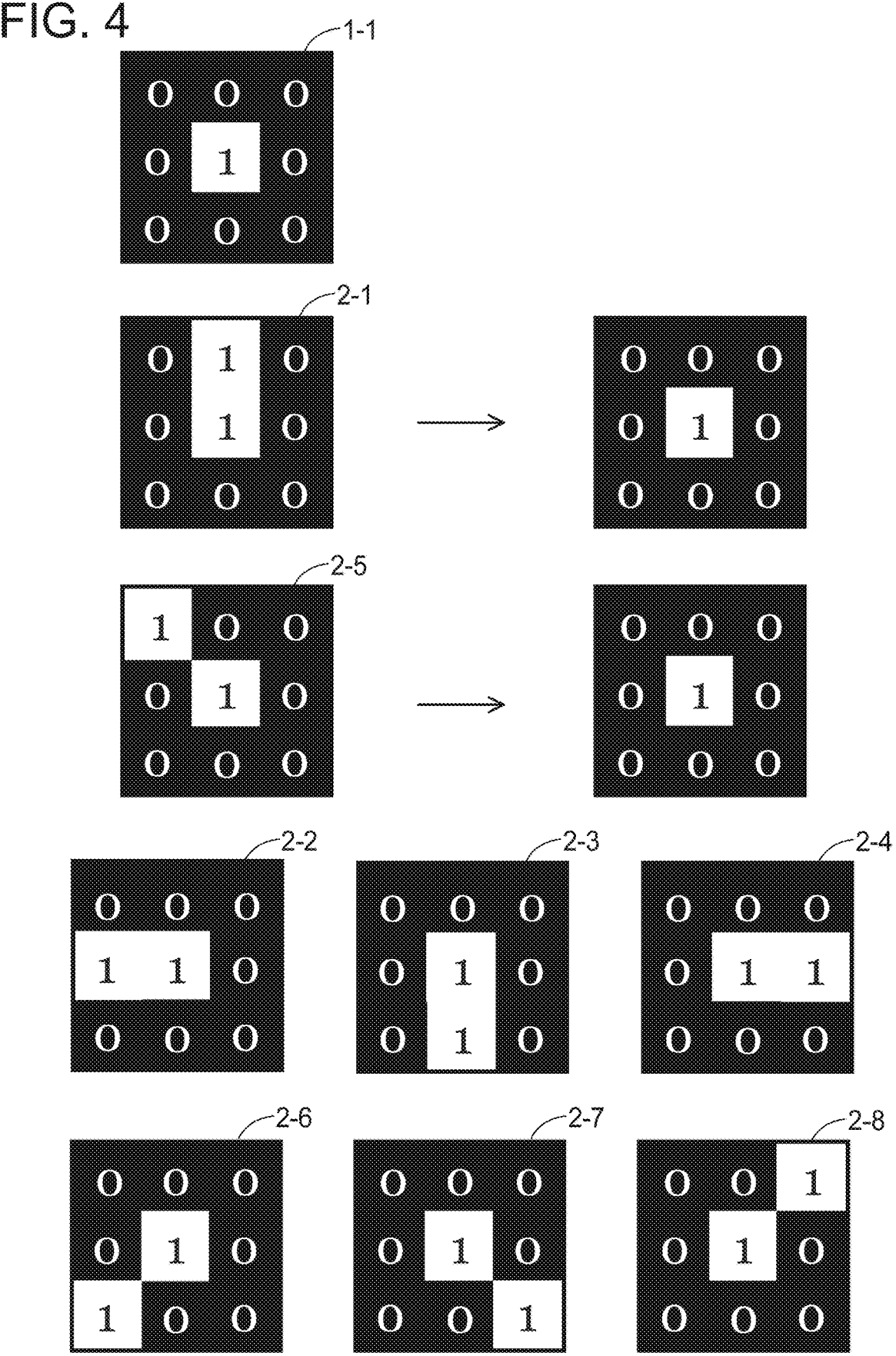
FIG. 4 shows examples of pattern data.
Figure 5:
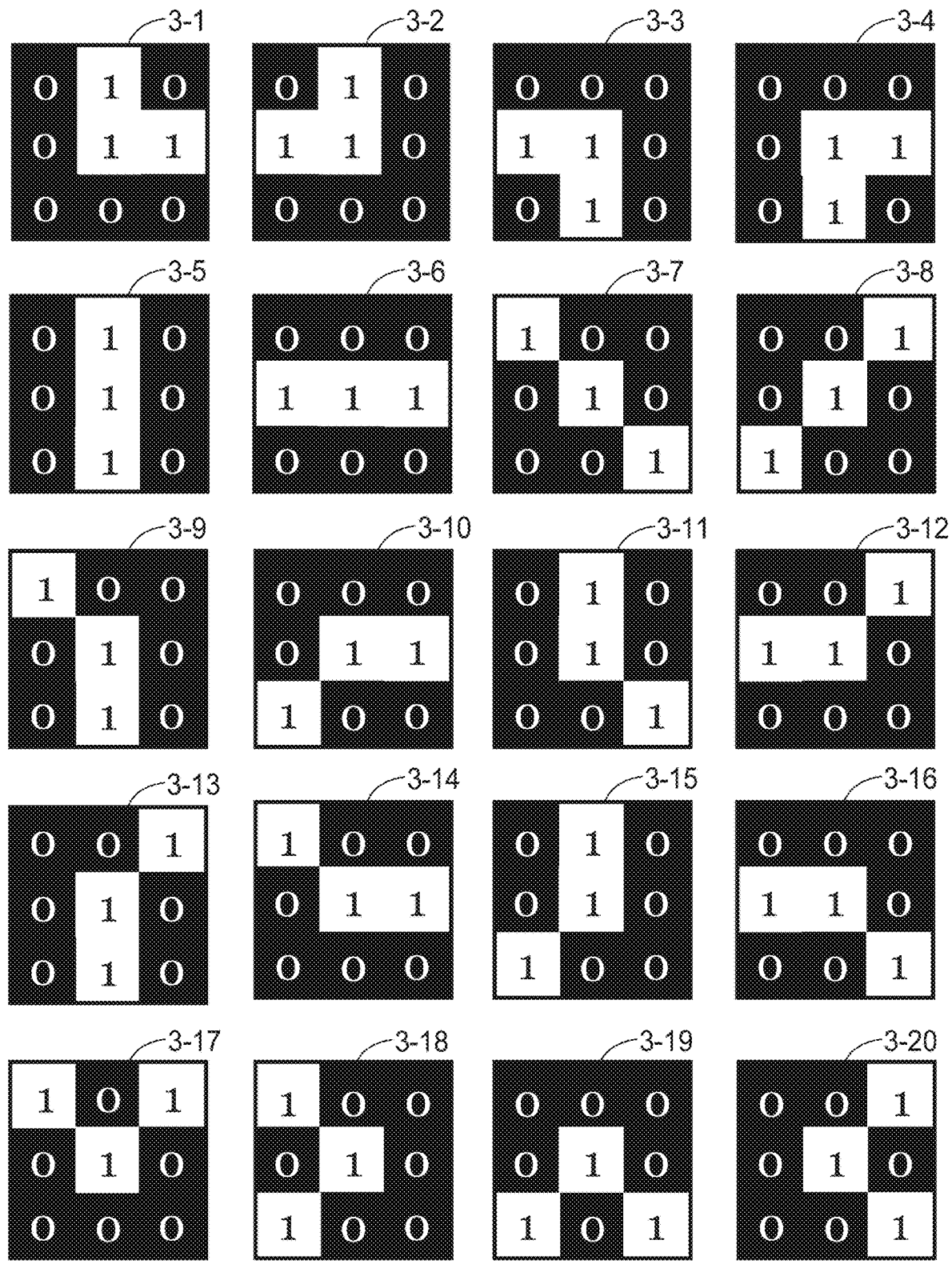
FIG. 5 shows examples of the pattern data.
Figure 6:
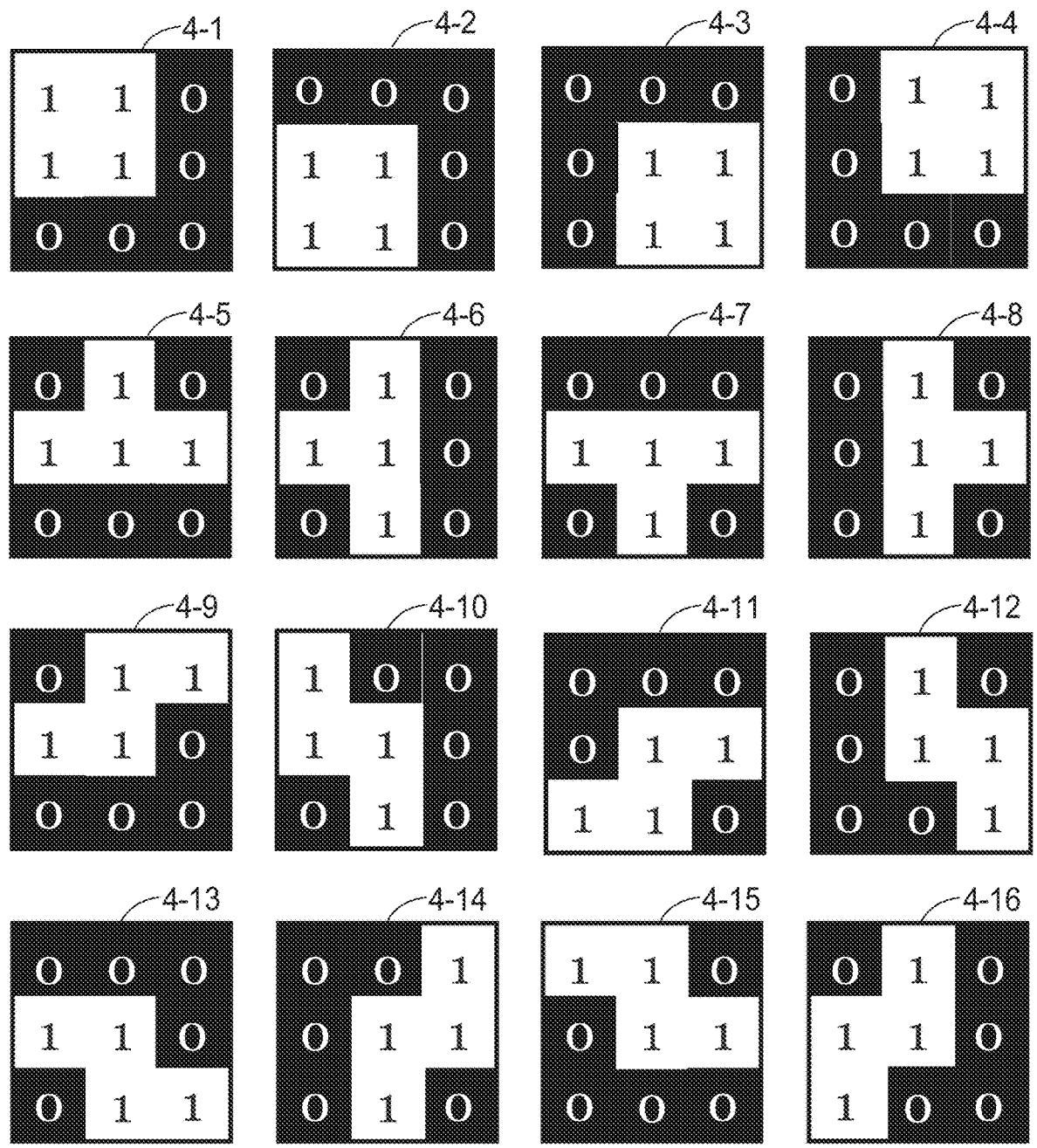
FIG. 6 shows examples of the pattern data.
Figure 7:
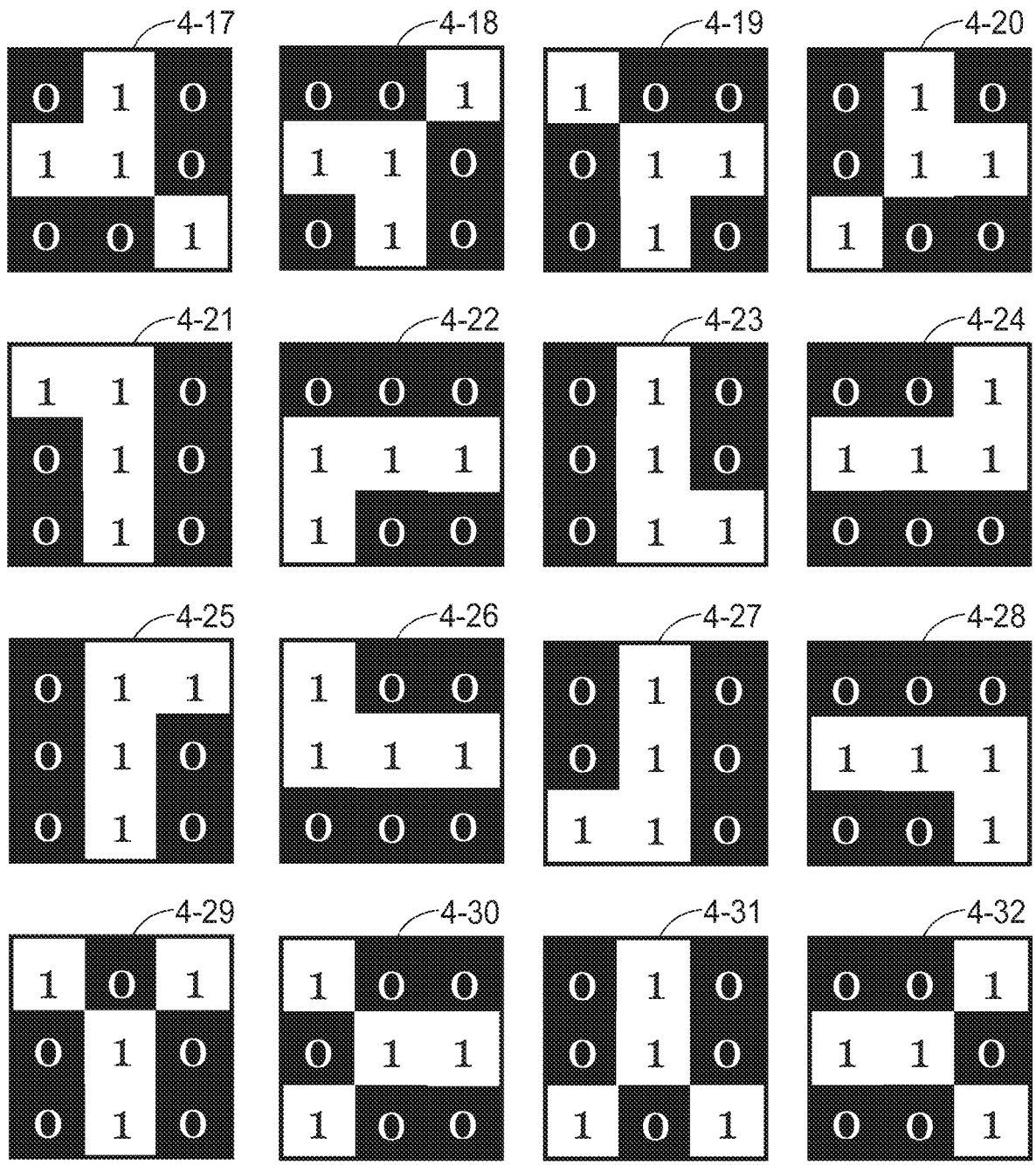
FIG. 7 shows examples of the pattern data.

Prior to describing contents of the processes of S110A to S110C of FIG. 3, details of the pattern data 42 used in S110A etc. will be described with reference to FIGS. 4 to 7. FIGS. 4 to 7 show the plurality of pattern data. Each pattern data includes nine (3×3) values constituted of three values arranged along the up-down direction and three values arranged along the left-right direction, and each of these nine values indicates a value "1" or "0". FIG. 4 shows one piece of pattern data 1-1 including one value "1" (that is, eight values "0") and eight pieces of pattern data 2-1 to 2-8 each including two values "1" (that is, seven values "0"). For example, the pattern data 2-1 is for generating data in which only one value "1" is described at the center position as a substitute for the two values "1" in the pattern data 2-1 in a case where there is data that matches an arrangement of the two values "1" in the pattern data 2-1. FIG. 5 shows twenty pieces of pattern data 3-1 to 3-20 each including three values "1" (that is, six values "0"). FIGS. 6 and 7 show thirty-two pieces of pattern data 4-1 to 4-32 each including four values "1" (that is, five values "0").

In either of the pattern data 1-1 to 4-32, the value located at the center among the nine values indicates "1". In the respective pattern data 1-1 to 4-32, arrangements of the value(s) "1" are different. For example, in the pattern data 2-1, the value at the center and the value thereabove indicate "1", whereas in the pattern data 2-5, the value at the center and the value at the upper left indicate "1". In a variant, one or more of the pattern data 1-1 to 4-32 may be omitted. For example, the pattern data 4-1 to 4-32 may be omitted. In another variant, the pattern data 3-1 to 3-20 and the pattern data 4-1 to 4-32 may be omitted. Further, in a yet another variant, pattern data each including five or more values "1" may further be used in addition to the respective pattern data 1-1 to 4-32.

(Comparison Process and Synthesis; FIGS. 8 to 12)

Next, details of the comparison process and the synthesis in S110A of FIG. 3 will be described with reference to FIGS. 8 to 12. In the comparison process of S110A, it is predetermined to use thirty-five pieces of pattern data among the plurality of pattern data included in the pattern data 42 (specifically, 4-3 to 4-28, 3-1 to 3-4, 2-3, 2-4, 2-7, 2-8, and, 1-1). Further, in the comparison process of S110A, it is also predetermined to use a plurality of sets, which will be described later. The plurality of sets includes twenty-two sets, which are a 4-1 set, a 4-2 set, a 4-29 set to a 4-32 set, and a 3-5 set to a 3-20 set. In S200 of FIG. 8, the CPU 32 selects one piece of pattern data or one set from among the thirty-five pieces of pattern data and the twenty-two sets. Hereinbelow, the pattern data or set selected here will be termed "target pattern data". The CPU 32 executes a sequence of respective processes from S205 (hereinbelow termed "process thread") in parallel by using the fifty-seven pattern data and sets (that is, thirty-five pieces of pattern data and twenty-two sets). For example, the CPU 32 executes the process thread by using first target pattern data selected in S200 in parallel with the process thread by using second target pattern data selected in S200. Similarly, the CPU 32 also executes the process threads by using the other target pattern data in parallel, thus it executes a total of fifty-seven process threads in parallel. Since the plurality of process threads is executed in parallel, processing time can be shortened.

In S205, the CPU 32 determines whether the target pattern data is a set or not. The CPU 32 proceeds to S245 of FIG. 12 in a case of determining that the target pattern data is a set (YES in S205), while it proceeds to S210 in a case of determining that the target pattern data is not a set (NO in S205).

In S210, the CPU 32 specifies one piece of partial data from the binary data 200 (see FIG. 3). One piece of partial data includes nine (3×3) values constituted of three values arranged along the left-right direction and three values arranged along the up-down direction. That is, a size of one piece of partial data is equal to the size of one piece of pattern data. Specifically, the CPU 32 specifies one piece of partial data located at the upper left corner of the binary data 200 in a first round of S210. Further, the CPU 32 moves to right by one to specify another one piece of partial data in a second round of S210 after the first round of S210 and processes of S215 to S225 to be described later have been executed. That is, the partial data in the first round and the partial data in the second round overlap each other. By repeating this, the CPU 32 sequentially specifies respective partial data from left to right. Further, after having specified rightmost partial data, the CPU 32 moves down by one in the subsequent round of S210 to specify a leftmost piece of partial data, and then moves to right by one to specify another one piece of partial data in the subsequent round of S210. By repeating this, the CPU 32 sequentially specifies, from the binary data 200, a plurality of partial data that includes two or more pieces of partial data arranged along the left-right direction and two or more pieces of partial data arranged along the up-down direction.

In S215, the CPU 32 compares the partial data specified in S210 (hereinbelow termed "target partial data") with the target pattern data to determine whether or not the target partial data matches the target pattern data. Specifically, in a case of determining that the arrangement of the value(s) "1" in the target partial data matches the arrangement of the value(s) "1" in the target pattern data, the CPU 32 determines that the target partial data matches the target pattern data (YES in S215) and proceeds to S220. On the other hand, in a case of determining that the arrangement of the value(s) "1" in the target partial data does not match the arrangement of the value(s) "1" in the target pattern data, the CPU 32 determines that the target partial data does not match the target pattern data (NO in S215) and proceeds to S225.

In S220, the CPU 32 stores the position (that is, the coordinate) of the value at the center in the target partial data in the memory 34.

In S225, the CPU 32 determines whether or not all the partial data have been specified in S210. The CPU 32 proceeds to S230 in a case of determining that all the partial data have been specified (YES in S225), while it returns to S210 in a case of determining that not all the partial data has been specified yet (NO in S225) and specifies subsequent partial data.

In S230, the CPU 32 generates pre-synthesis data by using the information of the respective positions (that is, the coordinates) stored in S220. Specifically, the CPU 32 describes the value "1" to each position stored in S220 and describes the value "0" to each position that was not stored in S220 to generate the pre-synthesis data including a plurality of values indicating "1" or "0". When the process of S230 is completed, the comparison process of FIG. 8 is terminated.

Figure 8:
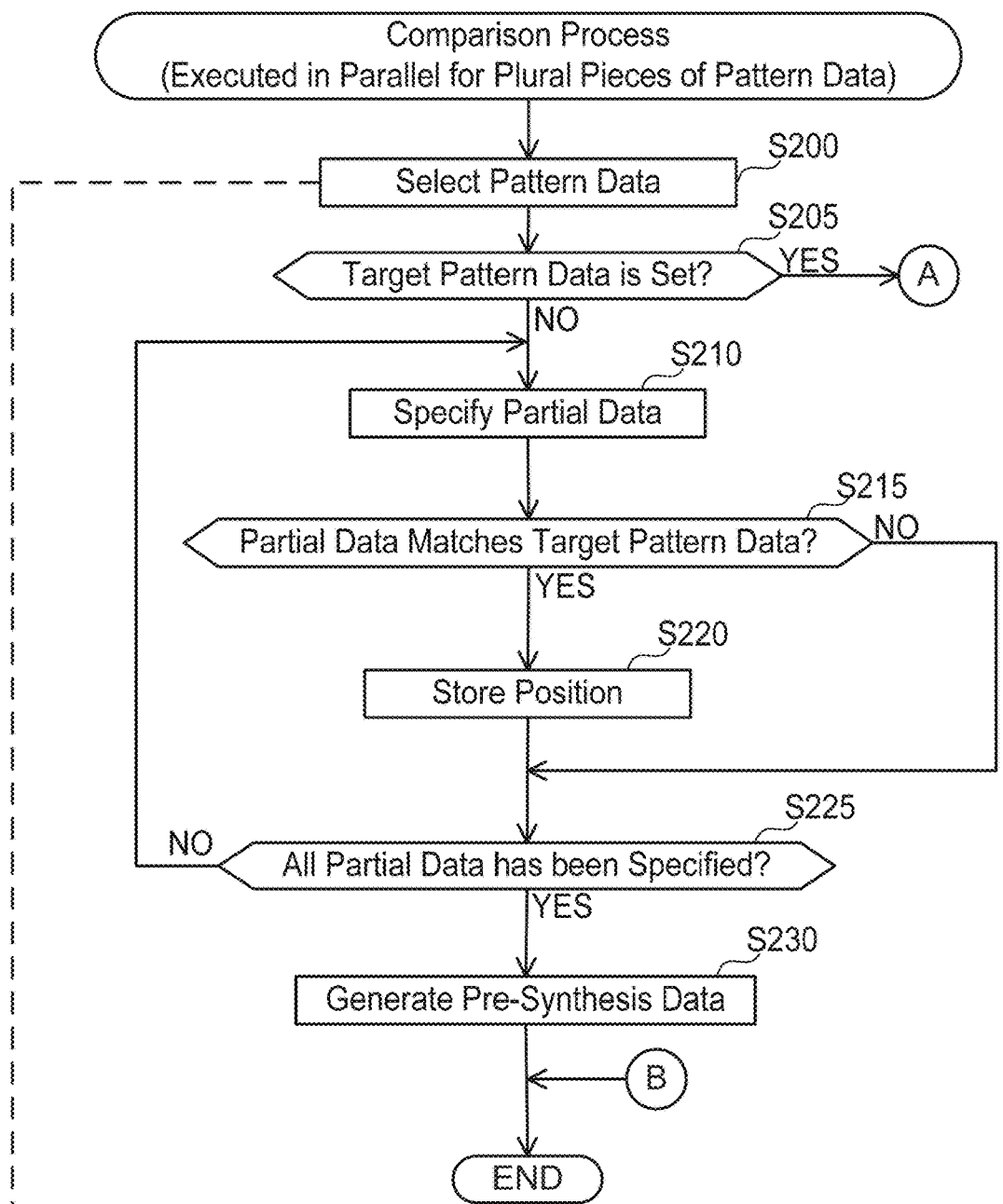
FIG. 8 shows a flowchart of a comparison process.
Figure 9:
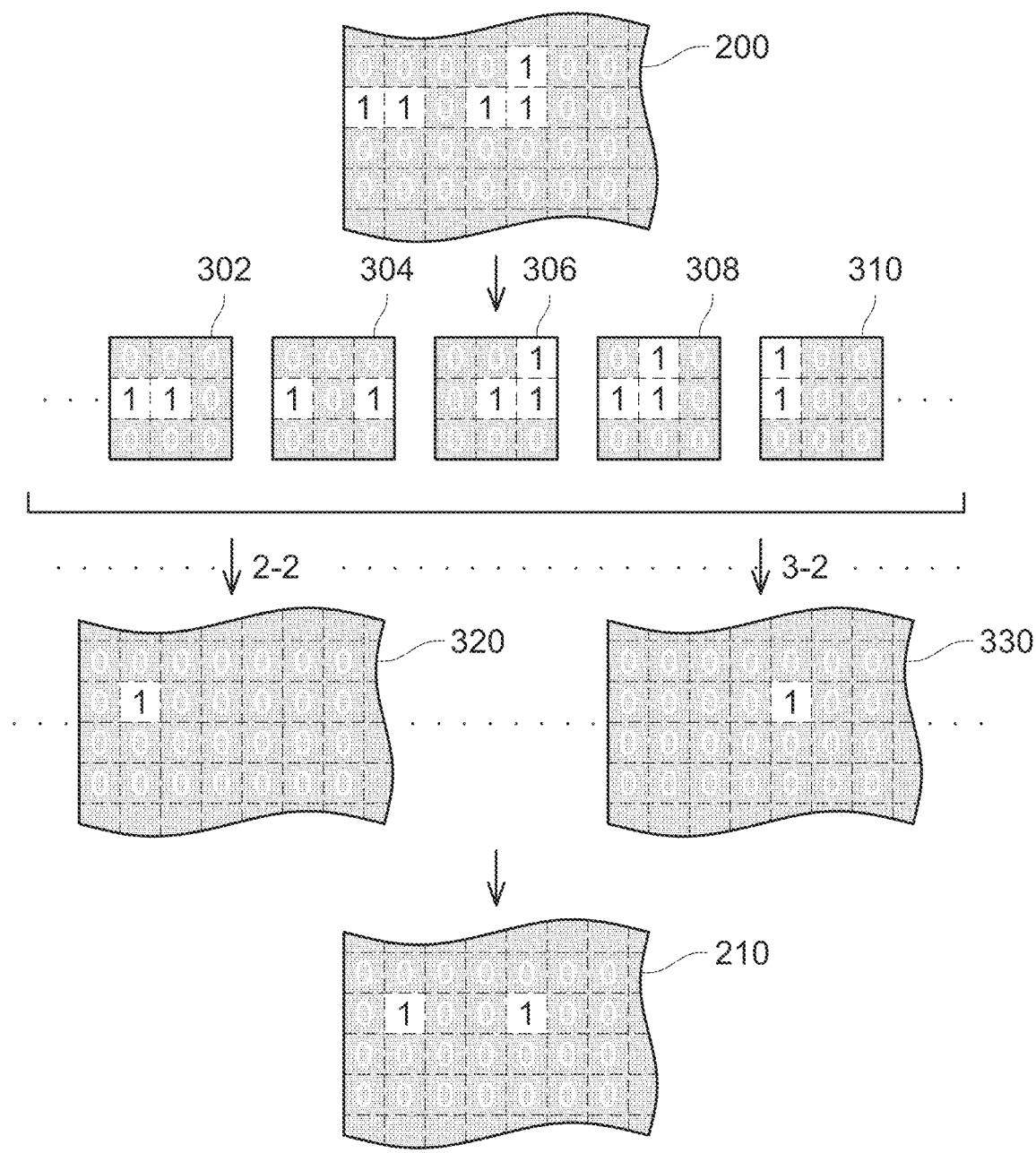
FIG. 9 shows an explanatory diagram for explaining the process of FIG. 8.

For example, a situation is here assumed in which there is the binary data 200 shown in FIG. 9 and the pattern data 3-2 (see FIG. 5) is selected in S200 of FIG. 8. In this case, partial data 302 to 310 are sequentially specified from the binary data 200 (S210) and the specified partial data (that is, the target partial data) are compared with the pattern data 3-2 (S215). Since the partial data 302 to 306 and 310 are determined as not matching the pattern data 3-2 (NO in S215), the positions of the values at the centers of the data 302, etc. are not stored (S220 is not executed). On the other hand, since the partial data 308 is determined as matching the pattern data 3-2 (YES in S215), the position of the value at the center of the partial data 308 is stored (S220). As above, pre-synthesis data 330 in which the value "1" is described at that position is generated (S230).

As described above, in the comparison process of S110A, the fifty-seven process threads corresponding to the fifty-seven pattern data and sets (that is, the thirty-five pieces of pattern data and the twenty-two sets) are executed in parallel. Due to this, fifty-seven pieces of pre-synthesis data corresponding to the fifty-seven pattern data and sets are generated (S230). In S110A (see FIG. 3), the CPU 32 further synthesizes the fifty-seven pieces of pre-synthesis data to generate synthesized data.

In the comparison process of S110B, the CPU 32 executes the comparison process and synthesis of FIG. 8 by using the synthesized data generated in S110A. In the comparison process of S110B, it is predetermined to use nine pieces of pattern data among the plurality of pattern data included in the pattern data 42 (specifically, 3-1 to 3-4, 2-1, 2-2, 2-5, 2-6, and 1-1). Further, in the comparison process of S110B, it is also predetermined to use sixteen sets, which are 3-5 set to 3-20 set. As such, the CPU 32 executes twenty-five process threads corresponding to the twenty-five pattern data and sets (that is, the nine pieces of pattern data and the sixteen sets) in parallel. Here, in S210, partial data are specified from the synthesized data generated in S110A. The CPU 32 generates twenty-five pieces of pre-synthesis data corresponding to the twenty-five pattern data and sets (S230) and generates synthetized data by synthesizing the twenty-five pieces of pre-synthesis data.

For example, the twenty-five pattern data and sets used in the comparison process of S110B include the pattern data 2-2 (see FIG. 4) and the pattern data 3-2 (see FIG. 5). For example, a situation is here assumed in which the reference sign 200 in FIG. 9 is the synthesized data generated in the comparison process of S110A. In this case, when the pattern data 3-2 is selected, the pre-synthesis data 330 is generated as described above. Further, when the pattern data 2-2 is selected, the partial data 302 is determined as matching the pattern data 2-2 (YES in S215), thus the position of the value at the center of the partial data 302 is stored (S220). Due to this, pre-synthesis data 320 in which the value "1" is described at that position is generated (S230). Then, the twenty-five pieces of pre-synthesis data including the pre-synthesis data 320, 330 are synthesized to generate synthesized data 210.

In the comparison process of S110C, the CPU 32 executes the comparison process and synthesis of FIG. 8 by using the synthesized data generated in S110B. In the comparison process of S110C, it is predetermined to use five pieces of pattern data among the plurality of pattern data included in the pattern data 42 (specifically, 2-1, 2-2, 2-5, 2-6, and 1-1). Here, no sets are used. As such, the CPU 32 executes five process threads corresponding to the five pieces of pattern data in parallel. Here, in S210, partial data are specified from the synthesized data generated in S110B. The CPU 32 generates five pieces of pre-synthesis data corresponding to the five pieces of pattern data (S230) and generates synthesized data by synthesizing the five pieces of pre-synthesis data.

Here, a comparative example that executes the following process instead of S110A to S110C of FIG. 3 is assumed. In the comparative example, only sixty-one pieces of pattern data included in the pattern data 42 (that is, 4-1 to 4-32, 3-1 to 3-20, 2-1 to 2-8, and 1-1) are used and no sets are used. In this case, sixty-one process threads corresponding to the sixty-one pieces of pattern data are executed in parallel, and sixty-one pieces of pre-synthesis data corresponding to the sixty-one pieces of pattern data are generated. Then, the sixty-one pieces of pre-synthesis data are synthesized to generate synthesized data.

Figure 10A:
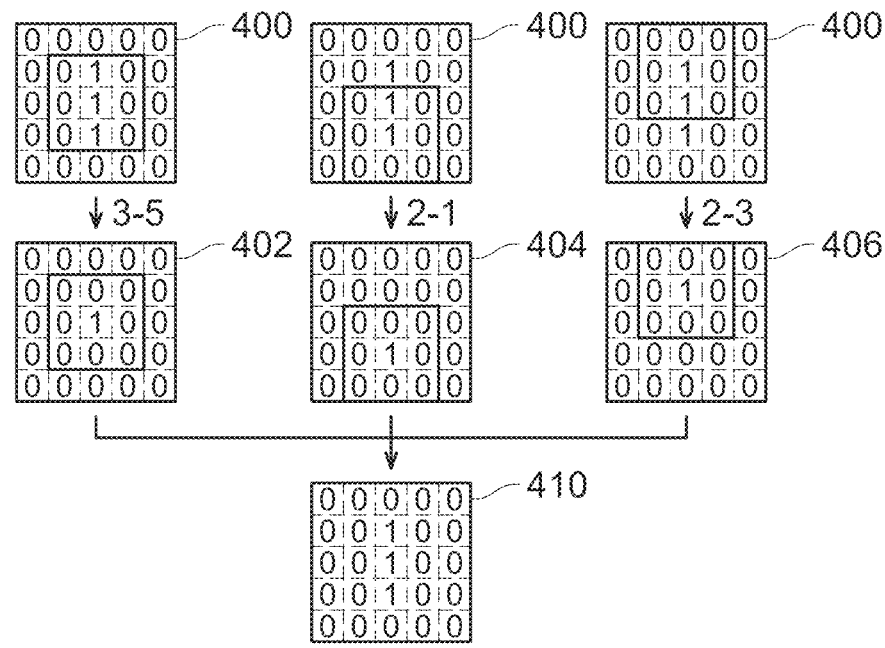
FIG. 10A to 10B show an explanatory diagram for explaining a set of pattern data.

For example, a situation is here assumed in which there is binary data 400 shown in FIG. 10A. The binary data 400 includes three adjacent values "1" due to three partial images being determined as including the same single cell object (YES in S15). When the pattern data 3-5 is selected, the partial data surrounded by a solid line in the binary data 400 matches the pattern data 3-5, therefore pre-synthesis data 402 is generated. Further, pre-synthesis data 404 is generated when the pattern data 2-1 is selected, and pre-synthesis data 406 is generated when the pattern data 2-3 is selected. Further, the pre-synthesis data 402, 404, and 406 are synthesized to generate synthesized data 410. In this case, an arrangement of the values "1" included in the synthesized data 410 is the same as the arrangement of the values "1" included in the binary data 400. As such, since the synthesized data 410 includes three values "1", the number of cell objects is incorrectly counted as "three" although it should be actually counted as "one". To solve such a problem, the present embodiment uses the sets in addition to the pattern data in the comparison processes.

Figure 10B:
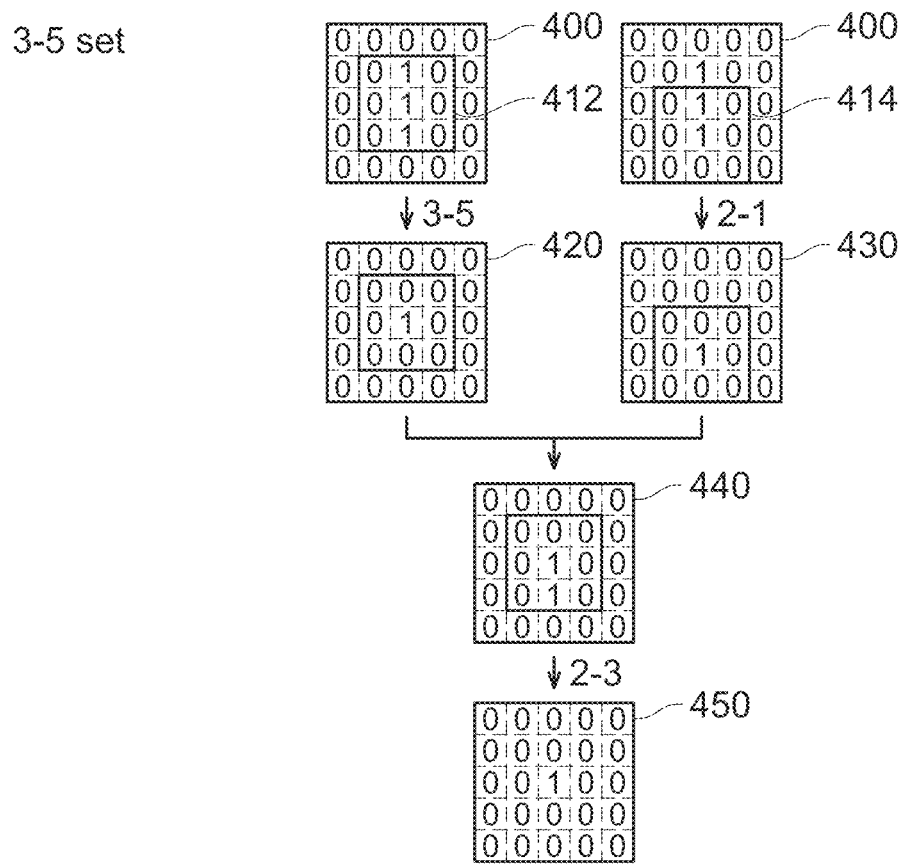

For example, FIG. 10B shows an example in which the 3-5 set is used. The 3-5 set includes two pieces of pattern data (that is, 3-5 and 2-1) for a first stage and one piece of pattern data (that is, 2-3) for a second stage. In this case, firstly, the process using the pattern data 3-5 for the first stage is executed on the binary data 400. In this case, partial data 412 in the binary data 400 is determined as matching the pattern data 3-5, and first intermediate data 420 in which the value "1" is described at a position corresponding to the position of the value at the center of the partial data 412 is generated. Further, the process using the pattern data 2-1 for the first stage is executed on the binary data 400. In this case, partial data 414 in the binary data 400 is determined as matching the pattern data 2-1, and second intermediate data 430 in which the value "1" is described at a position corresponding to the position of the value at the center of the partial data 414 is generated. Then, the first intermediate data 420 and the second intermediate data 430 are synthesized to generate third intermediate data 440. In the third intermediate data 440, the value "1" included in the first intermediate data 420 and the value "1" included in the second intermediate data 430 are adjacent to each other. After this, the process using the pattern data 2-3 for the second stage is executed on the third intermediate data 440 and pre-synthesis data 450 is thereby generated. As above, since the pre-synthesis data 450 that includes only one value "1" is generated, "one" can accurately be counted as the number of cell object.

Figure 12:
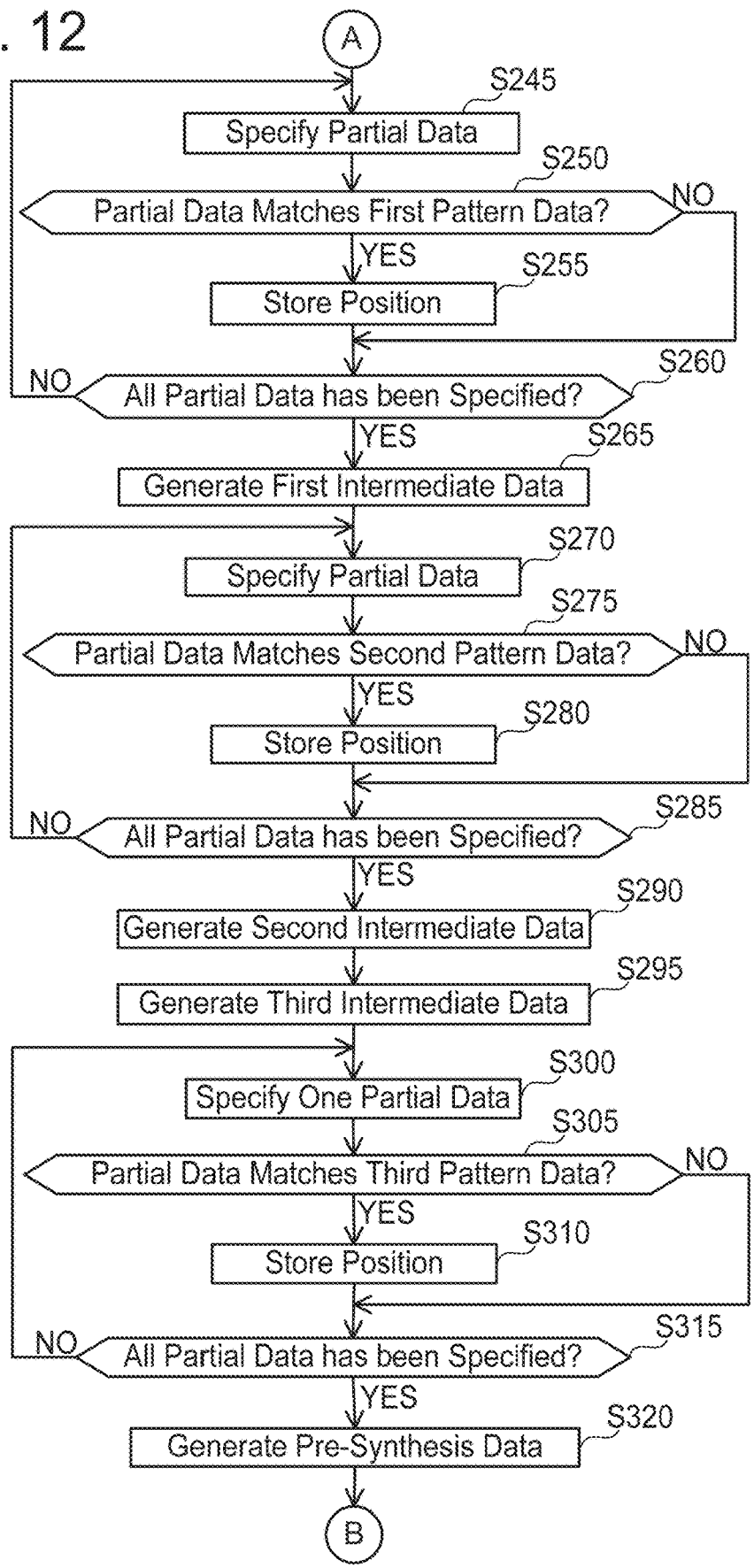
FIG. 12 shows a flowchart continued from FIG. 8.

FIG. 12 shows a flowchart for executing the process exemplified in FIG. 10B. In the case of determining that a set is selected as the target pattern data in S205 of FIG. 8 (that is, YES in S205), the CPU 32 executes the process shown in FIG. 12. S245 to S260 are the same as S210 to S225 of FIG. 8, except that first pattern data, which is one of two pieces of pattern data for the first stage included in the set, is used. In S265, the CPU 32 generates first intermediate data by using the information of the respective positions (that is, the coordinates) stored in S255. Due to this, for example, the first intermediate data 420 is generated by using the pattern data 3-5 (which is an example of the first pattern data) of FIG. 10B.

S270 to S285 are the same as S210 to S225 of FIG. 8, except that second pattern data, which is the other of the two pieces of pattern data for the first stage included in the set, is used. In S290, the CPU 32 generates second intermediate data by using the information of the respective positions (that is, the coordinates) stored in S280. Due to this, for example, the second intermediate data 430 is generated by using the pattern data 2-1 (which is an example of the second pattern data) of FIG. 10B. The processes of S245 to S265 in which the first pattern data is used and the processes of S270 to S290 in which the second pattern data is used may be executed in parallel. By doing so, processing time can be shortened.

In S295, the CPU 32 synthesizes the first intermediate data generated in S265 and the second intermediate data generated in S290 to generate third intermediate data. Due to this, for example, the third intermediate data 440 is generated by synthesizing the first intermediate data 420 and the second intermediate data 430 of FIG. 10B.

S300 to S315 are the same as S210 to S225, except that partial data are specified from the third intermediate data generated in S295 and that third pattern data for the second stage included in the set is used. In S320, the CPU 32 generates pre-synthesis data by using the information of the respective positions (that is, the coordinates) stored in S310. Due to this, for example, the pre-synthesis data 450 is generated by using the pattern data 2-3 (which is an example of the third pattern data) on the third intermediate data 440 of FIG. 10B. When the process of S320 is completed, the process of FIG. 12 is terminated and the process of FIG. 8 is terminated.

FIG. 11 shows other sets according to the present embodiment. For example, the 3-6 set includes two pieces of pattern data 3-6, 2-2 for the first stage and one piece of pattern data 2-4 for the second stage. Similarly, the 3-7 set to 3-20 set, the 4-1 set, the 4-2 set, the 4-29 set to 4-32 set each include three pieces of pattern data (that is, two pieces of pattern data for the first stage and one piece of pattern data for the second stage) shown in FIG. 11.

In the comparison process of S110A of FIG. 3, for example, the CPU 32 executes the process of FIG. 12 by using each of the twenty-two sets included in the pattern data 42 (that is, the 4-1 set, the 4-2 set, the 4-29 set to 4-32 set, and the 3-5 set to 3-20 set). Further, in the comparison process of S110B, the CPU 32 executes the process of FIG. 12 by using each of the sixteen sets included in the pattern data 42 (that is, the 3-5 set to 3-20 set). Since the comparison processes using the sets as above are executed in the present embodiment, the problem with the above comparative example does not occur and the numbers of cell objects can accurately be specified. Further, in each of S110A to S110C, final synthesized data (such as the reference sign 210 of FIG. 3) is generated in multiple stages by using some pieces of the pattern data and some of the sets. Due to this, generation of synthesized data in which two or more values "1" are described with respect to one cell object can be suppressed, as a result of which the numbers of cell objects can accurately be specified.

Effects of Present Embodiment

In the present embodiment, the image analysis device 10 generates the first specific data 150 (see FIG. 2) that includes the plurality of values arranged at the plurality of positions corresponding to the plurality of partial images 102 etc. specified from the cell image 100 (S35), specifies a plurality of partial data from the first specific data 150 (S210 of FIG. 8), and counts the numbers of cell objects included in the cell image 100 by using the plurality of partial data and the predefined plurality of pattern data 42 (S40 of FIG. 2 (FIGS. 3, 8, and 12)). Here, in the case of determining that the arrangement of the value(s) "1" in the target partial data matches the arrangement of the value(s) "1" in the target pattern data (YES in S215 of FIG. 8, YES in S250, YES in S275, and YES in S305 of FIG. 12), the image analysis device 10 counts "one" as the number of cell object for the target partial data, despite the target partial data including two or more values "1" (S125, S130). As such, the image analysis device 10 can accurately count the numbers of cell objects included in the cell image 100.

Further, even when two or more presence values are described for one cell object in the first specific data 150 (see FIG. 2), the image analysis device 10 generates the second specific data in which one value "1" is described as a substitute for the two or more adjacent presence values, in the count process of S40 (S125). Due to this, the image analysis device can count the number of cell object as "one". Due to this as well, the image analysis device 10 can accurately count the numbers of cell objects included in the cell image 100.

(Corresponding Relationships)

The left-right direction and the up-down direction are respectively examples of "first direction" and "second direction". The presence value "1" and the presence value "2" are respectively examples of "first presence value" and "second presence value". The 3×3 values in the partial data and the pattern data are an example of "(M×N) values". In a variant, the M and the N may be "2", or may be "4" or more (such as an odd number of "5"). The value "1" and the value "0" included in the pattern data are respectively examples of "first predetermined value" and "second predetermined value". The value "1" and the value "0" in the first intermediate data 420 of FIG. 10B are respectively examples of "third predetermined value" and "fourth predetermined value". In a variant, the "third predetermined value" and the "fourth predetermined value" may respectively be different values from the "first predetermined value" and the "second predetermined value". For example, the partial data 302 in the case where the pattern data 2-2 is used in FIG. 9, the partial data 308 in the case where the pattern data 3-2 is used in FIG. 9, and the partial data 412 in the case where the pattern data 3-5 is used in FIG. 10B are examples of "first (or second) target partial data". The position stored in S220 of FIG. 8 (that is, the center position of the target partial data) is an example of "predetermined position". In a variant, another position in the target partial data (which is an example of the "predetermined position") may be stored in S220, instead of the center position of the target partial data. The pattern data 3-5, the pattern data 2-1, and the pattern data 2-3 in FIG. 10B are respectively examples of "first pattern data", "second pattern data", and "third pattern data". The partial data specified in S300 of FIG. 12 is an example of "purpose data".

The process of S5, the process of S10, the process of S15, the process of S35, the process of S40, and the process of S45 of FIG. 2 are respectively examples of processes executed by "acquiring unit", "partial image specifying unit", "cell determining unit", "first specific data generating unit", "counter unit", and "output unit". The process of S215 of FIG. 8 and the processes of S250, S275, and S305 of FIG. 12 are examples of processes executed by "first (or second) presence value determining unit". The process of S125 of FIG. 3 is an example of a process executed by "second specific data generating unit". The process of S265, the process of S290, and the process of S395 of FIG. 12 are respectively examples of processes executed by "first intermediate data generating unit", "second intermediate data generating unit", and "third intermediate data generating unit". The process of S300 and the process of S305 are respectively examples of processes executed by "purpose data specifying unit" and "predetermined value determining unit".

Specific examples of the present disclosure have been described in detail, however, these are mere exemplary indications and thus do not limit the scope of the claims. The art described in the claims include modifications and variations of the specific examples presented above. Variants of the above-described embodiment will be described below.

In the comparison process of FIG. 8, the process threads may not be executed in parallel. In this case, the CPU 32 sequentially executes the process threads by sequentially using the sixty-one pieces of pattern data (specifically, 4-1 to 4-32, 3-1 to 3-20, 2-1 to 2-8, and 1-1), instead of S110A to S110C. For example, the CPU 32 generates processed data in a similar manner to the procedure according to which the CPU 32 selects the pattern data 4-1 as the target pattern data in S200, executes the processes of S210 to S225, and generates the pre-synthesis data in S230. Then, the CPU 32 selects the pattern data 4-2 as the target pattern data in S200, executes the processes of S210 to S225 on the processed data as above, and generates new processed data in S230. By repeating this, the CPU 32 generates final processed data. In this variant, the number of cell object can be counted by counting the number of the values "1" included in the final processed data. Further, since the plural process threads are not executed in parallel in this variant, the problem of the comparative example as above does not occur, as a result of which the sets do not need to be used. Thus, the "first intermediate data generating unit", the "second intermediate data generating unit", the "third intermediate data generating unit", the "purpose data specifying unit", and the "predetermined value determining unit" can be omitted.

Moreover, technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

REFERENCE SIGNS LIST

10: image analysis device, 12: operation unit, 14: display unit, 16: input unit, 30: controller, 32: memory, 36: OS program, 38: analysis program, 40: analysis data, 42: pattern data, 44: classification data, 100: cell image, 110, 120, 130, 140: cell object, 102, 104, 112, 114, 116, 122, 124, 132, 134, 136, 138, 142, 144: partial image, 150: first specific data, 160: second specific data, 200, 400: binary data, 210, 410: synthesized data, 302, 304, 306, 308, 310, 412, 414: partial data, 320, 330, 402, 404, 404, 450: pre-synthesis data, 420: first intermediate data, 430: second intermediate data, 440: third intermediate data

The invention claimed is:

1. An image analysis device comprising:
an acquiring unit configured to acquire cell image data representing a cell image including one or more types of cell objects indicating one or more types of cells;
a partial image specifying unit configured to specify a plurality of partial images from the cell image, wherein the plurality of partial images each has a same size, and the cell image includes two or more partial images arranged along a first direction and two or more partial images arranged along a second direction perpendicular to the first direction;
a cell determining unit configured to determine, for each of the plurality of partial images, whether or not the partial image includes any of the one or more types of cell objects;
a first specific data generating unit configured to generate first specific data including a plurality of values arranged at a plurality of positions corresponding to the plurality of partial images, wherein the plurality of values included in the first specific data includes an absence value arranged at a position corresponding to a partial image determined as not including any of the one or more types of cell objects and a first presence value arranged at a position corresponding to a partial image determined as including a first type of cell object among the one or more types of cell objects;
a partial data specifying unit configured to specify a plurality of partial data from the first specific data, wherein the partial data each includes (M×N) values constituted of M values arranged along the first direction (where the M is an integer of 2 or greater) and N values arranged along the second direction (where the N is an integer of 2 or greater);
a counter unit configured to count a number of the first type of cell objects included in the cell image by using the plurality of partial data and a predetermined plurality of pattern data, wherein the pattern data each includes (M×N) values constituted of the M values arranged along the first direction and the N values arranged along the second direction, the (M×N) values included in the pattern data include two or more first predetermined values and one or more second predetermined values, and the plurality of pattern data each has a different arrangement of the first predetermined value; and
an output unit configured to output a count result, wherein the counter unit comprises a first presence value determining unit configured to determine, for each of the plurality of partial data, whether or not an arrangement of the first presence value in the partial data matches an arrangement of the first predetermined value in any of the plurality of pattern data, and
in a case of determining that an arrangement of the first presence value in first target partial data among the plurality of partial data matches an arrangement of the first predetermined value in any of the plurality of pattern data, the counter unit counts "one" as a number of the first type of cell objects corresponding to the first target partial data despite the (M×N) values included in the first target partial data including two or more first presence values.

2. The image analysis device according to claim 1, wherein
the counter unit further comprises a second specific data generating unit configured to generate second specific data by using the plurality of partial data and the plurality of pattern data, wherein the second specific data includes a plurality of values arranged at a plurality of positions corresponding to the plurality of partial images, and the plurality of values included in the second specific data includes one or more first presence values and the absence value arranged at a position corresponding to a partial image determined as not including any of the one or more types of cell objects,
in the case of determining that the arrangement of first presence value in the first target partial data matches the arrangement of the first predetermined value in one of the plurality of pattern data, the second specific data generating unit generates the second specific data by describing one first presence value at a predetermined position corresponding to the first target partial data instead of two or more adjacent first presence values included in the first target partial data, and
the counter unit counts the number of the first type of cell object included in the cell image by counting a number of the first presence values included in the second specific data.

3. The image analysis device according to claim 1, wherein
the M and the N of the partial data or of the pattern data are a same odd number of 3 or greater,
the plurality of pattern data includes a set of three or more predetermined pattern data,
the counter unit further comprises:
a first intermediate data generating unit configured to generate first intermediate data in a case of determining that the arrangement of the first presence value in the first target partial data matches an arrangement of the first predetermined value in first pattern data included in the set, wherein the first intermediate data has a third predetermined value described at a position corresponding to a center in the (M×N) values included in the first target partial data and a fourth predetermined value described at each position corresponding to each value other than the center in the (M×N) values included in the first target partial data;
a second intermediate data generating unit configured to generate second intermediate data in a case of determining that an arrangement of the first presence value in second target partial data matches an arrangement of the first predetermined value in second pattern data, wherein the second target partial data is among the plurality of partial data and is adjacent to the first target partial data, the second pattern data is included in the set and is different from the first pattern data, and the second intermediate data has the third predetermined value described at a position corresponding to a center in (M×N) values included in the second target partial data and the fourth predetermined value described at each position corresponding to each value other than the center in the (M×N) values included in the second target partial data;

a third intermediate data generating unit configured to generate third intermediate data by synthesizing the first intermediate data and the second intermediate data, wherein the third predetermined value included in the first intermediate data and the third predetermined value included in the second intermediate data are adjacent each other in the third intermediate data;

a purpose data specifying unit configured to sequentially specify a plurality of purpose data from the third intermediate data, wherein the purpose data each includes (M×N) values constituted of M values arranged along the first direction and N values arranged along the second direction; and a predetermined value determining unit configured to determine, for each of the plurality of purpose data, whether or not an arrangement of the third predetermined value in the purpose data matches an arrangement of the first predetermined value in third pattern data that is included in the set and is different from the first and second pattern data, and in a case of determining that an arrangement of the third predetermined value in target purpose data, which is among the plurality of purpose data and includes two or more third predetermined values, matches the arrangement of the first predetermined value in the third pattern data, the counter unit counts "one" as the number of the first type of cell object corresponding to the first target partial data.

4. The image analysis device according to claim 1, wherein
the plurality of values included in the first specific data further includes a second presence value arranged at a position corresponding to a partial image determined as including a second type of cell object, wherein the second presence value is different from the first presence value, wherein the second type of cell object is among the one or more types of cell objects and is different from the first type of cell object, the counter unit comprises a second presence value determining unit configured to determine, for each of the plurality of partial data, whether or not an arrangement of the second presence value in the partial data matches an arrangement of the first predetermined value in any of the plurality of pattern data, and in a case of determining that an arrangement of the second presence value in second target partial data among the plurality of partial data matches an arrangement of the first predetermined value in any of the plurality of pattern data, the counter unit counts "one" as a number of the second type of cell object corresponding to the second target partial data despite (M×N) values included in the second target partial data including two or more second presence values.

5. A non-transitory computer readable medium storing computer readable instructions for an image analysis device that when executed cause a computer of the image analysis device to:

acquire cell image data representing a cell image including one or more types of cell objects indicating one or more types of cells;

specify a plurality of partial images from the cell image, wherein the plurality of partial images each has a same size, and the cell image includes two or more partial images arranged along a first direction and two or more partial images arranged along a second direction perpendicular to the first direction;

determine, for each of the plurality of partial images, whether or not the partial image includes any of the one or more types of cell objects;

generate first specific data including a plurality of values arranged at a plurality of positions corresponding to the plurality of partial images, wherein the plurality of values included in the first specific data includes an absence value arranged at a position corresponding to a partial image determined as not including any of the one or more types of cell objects and a first presence value arranged at a position corresponding to a partial image determined as including a first type of cell object among the one or more types of cell objects;

specify a plurality of partial data from the first specific data, wherein the partial data each includes (M×N) values constituted of M values arranged along the first direction (where the M is an integer of 2 or greater) and N values arranged along the second direction (where the N is an integer of 2 or greater);

count a number of the first type of cell object included in the cell image by using the plurality of partial data and a predetermined plurality of pattern data, wherein the pattern data each includes (M×N) values constituted of the M values arranged along the first direction and the N values arranged along the second direction, the (M×N) values included in the pattern data include two or more first predetermined values and one or more second predetermined values, and the plurality of pattern data each has a different arrangement of the first predetermined value;

output a count result;

determine, for each of the plurality of partial data, whether or not an arrangement of the first presence value in the partial data matches an arrangement of the first predetermined value in any of the plurality of pattern data, and in a case of determining that an arrangement of the first presence value in first target partial data among the plurality of partial data matches an arrangement of the first predetermined value in any of the plurality of pattern data, count "one" as a number of the first type of cell object corresponding to the first target partial data despite the (M×N) values included in the first target partial data including two or more first presence values.

* * * * *